United States Patent
Sugimoto et al.

(10) Patent No.: US 10,450,454 B2
(45) Date of Patent: Oct. 22, 2019

(54) RUBBER COMPOSITION FOR TIRE AND PNEUMATIC TIRE

(71) Applicant: The Yokohama Rubber Co., LTD., Minato-ku, Tokyo (JP)

(72) Inventors: Hiroki Sugimoto, Hiratsuka (JP); Makoto Ashiura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 49 days.

(21) Appl. No.: 15/507,191

(22) PCT Filed: Aug. 24, 2015

(86) PCT No.: PCT/JP2015/073759
§ 371 (c)(1),
(2) Date: Feb. 27, 2017

(87) PCT Pub. No.: WO2016/031783
PCT Pub. Date: Mar. 3, 2016

(65) Prior Publication Data
US 2018/0237631 A1    Aug. 23, 2018

(30) Foreign Application Priority Data

Aug. 27, 2014 (JP) .................................. 2014-173300

(51) Int. Cl.
| | |
|---|---|
| *C08L 53/02* | (2006.01) |
| *C08K 3/36* | (2006.01) |
| *C08L 7/00* | (2006.01) |
| *C08L 15/00* | (2006.01) |
| *B60C 1/00* | (2006.01) |

(52) U.S. Cl.
CPC .......... *C08L 53/025* (2013.01); *B60C 1/0016* (2013.01); *C08K 3/36* (2013.01); *C08L 7/00* (2013.01); *C08L 15/00* (2013.01); *C08L 2205/03* (2013.01); *Y02T 10/862* (2013.01)

(58) Field of Classification Search
CPC .......... C08K 3/36; C08F 297/044; B60C 1/00
See application file for complete search history.

(56) References Cited

U.S. PATENT DOCUMENTS

| | | | | |
|---|---|---|---|---|
| 2013/0338255 A1* | 12/2013 | Naka | ..................... | B60C 1/0016 523/155 |
| 2014/0011909 A1 | 1/2014 | Satou et al. | | |
| 2015/0031791 A1* | 1/2015 | Sugiura | ................... | C08L 15/00 523/156 |
| 2015/0133600 A1* | 5/2015 | Iizuka | ...................... | B60C 1/00 524/573 |

FOREIGN PATENT DOCUMENTS

| | | |
|---|---|---|
| JP | 2012-117022 | 6/2012 |
| JP | 2014-047295 | 3/2014 |
| WO | WO 2012/073837 | 6/2012 |
| WO | WO 2012/073841 | 6/2012 |
| WO | 2013 122237 * | 8/2013 |
| WO | WO 2014/050341 | 4/2014 |

OTHER PUBLICATIONS

International Search Report for International Application No. PCT/JP2015/073759 dated Nov. 24, 2015, 4 pages, Japan.

* cited by examiner

*Primary Examiner* — Kuo Liang Peng
(74) *Attorney, Agent, or Firm* — Thorpe North & Western

(57) ABSTRACT

A diene-based rubber contains natural rubber and specific conjugated diene-based rubber. The content of the natural rubber in the diene-based rubber is 30 to 45 mass %. The content of the specific conjugated diene-based rubber in the diene-based rubber is 30 to 70 mass %. The specific conjugated diene-based rubber is conjugated diene-based rubber produced according to a specific production method. In the conjugated diene-based rubber, the aromatic vinyl unit content, the vinyl bond content, and the weight average molecular weight are within a predetermined range. The CTAB adsorption specific surface area of the silica is 180 $m^2/g$ or greater. The content of the silica is less than 60 parts by mass per 100 parts by mass of the diene-based rubber.

6 Claims, 1 Drawing Sheet

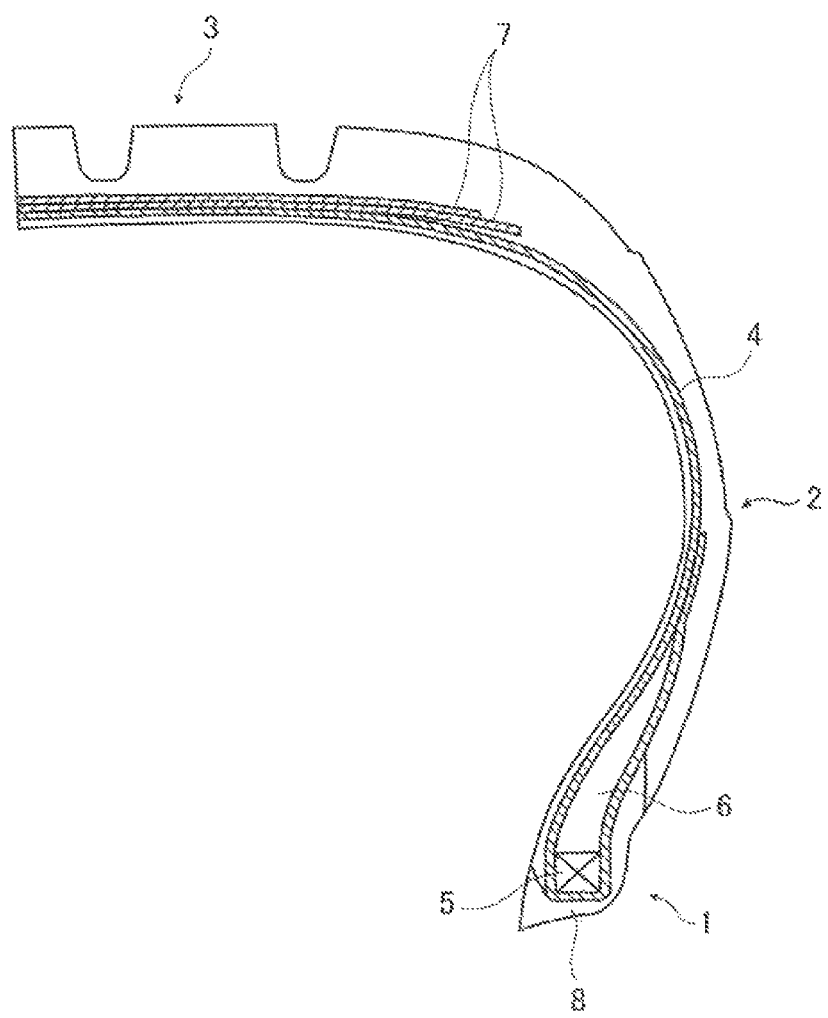

RUBBER COMPOSITION FOR TIRE AND PNEUMATIC TIRE

TECHNICAL FIELD

The present technology relates to a rubber composition for a tire and a pneumatic tire.

BACKGROUND ART

In recent years, there has been a demand to reduce tire rolling resistance from the perspective of fuel efficiency when a vehicle is traveling. In addition, there has been a demand for enhancement in wet performance (control performance on a wet road surface) from the perspective of safety. To meet these demands, a method of establishing compatibility for low rolling resistance and wet performance by compounding silica to a rubber component constituting a tread portion of a tire is known.

However, silica has low affinity with rubber components, and the cohesiveness between silica components is high, so if silica is simply compounded to the rubber component, the silica is not dispersed, which leads to a problem that the effect of reducing the rolling resistance or the effect of improving the wet performance cannot be sufficiently achieved.

Therefore, International Patent Application Publication No. WO 2014/050341 discloses conjugated diene-based rubber obtained by reacting a conjugated diene-based polymer chain having an active terminal with a predetermined modifying agent. International Patent Application Publication No. WO 2014/050341 describes that by using the above conjugated diene-based rubber, the affinity between the silica and the rubber is good, and reduced heat build-up (low rolling resistance) of a tire and wet grip performance can be enhanced.

Meanwhile, environmental issues and resource problems have led to a demand for a higher fuel efficiency in vehicles, which in turn has led to a demand for further enhancements in the low rolling resistance of tires. In addition, along with improvements in the required safety level, there has also been a demand for further improvements in wet performance. Further, from the perspective of a production process, there has also been a demand for reduction of viscosity and improvement in workability.

To reflect on these, when the present inventor, et al., studied the conjugated diene-based rubber described in International Patent Application Publication No. WO 2014/050341, it became obvious that the rubber composition for a tire obtained did not necessarily satisfy the level recently required for the viscosity, the workability, the wet performance, and the low rolling resistance when formed into a tire.

SUMMARY

The present technology provides: a rubber composition for a tire having a low viscosity, an excellent workability, and excellent wet performance and low rolling resistance, when formed into a tire; and a pneumatic tire using the above mentioned rubber composition.

As a result of diligent research to solve the above problems, the inventors of the present technology have found that it is possible to solve the problems described above by using, in combination, a natural rubber and a specific conjugated diene-based rubber at a predetermined proportion and using silica having a particular CTAB (cetyltrimethylammonium bromide) adsorption specific surface area, and thus led to the present technology.

That is, the present inventor discovered that it is possible to solve the problems described above the following constitutions.

(1) A rubber composition for tires, including: diene-based rubber and silica, in which the diene-based rubber contains natural rubber and specific conjugated diene-based rubber, the content of the natural rubber in the diene-based rubber is 30 to 45 mass %, and the content of the specific conjugated diene-based rubber in the diene-based rubber is from 30 to 70 mass %; and the specific conjugated diene-based rubber is conjugated diene-based rubber produced according to a method of producing conjugated diene-based rubber including the following steps of A, B, and C in this order, the conjugated diene-based rubber having: the aromatic vinyl unit content of from 38 to 48 mass %, the vinyl bond content of from 20 to 35 mass %, and the weight average molecular weight of from 500000 to 800000, and the CTAB adsorption specific surface area of the silica is 180 $m^2/g$.

(4) The rubber composition for a tire, in which the content of the silica is less than 60 parts by mass per 100 parts by mass of the diene-based rubber.

step A: polymerizing a monomer mixture containing isoprene and aromatic vinyl to form a polymer block A having an active terminal, the polymer block A having an isoprene unit content of from 80 to 95 mass %, an aromatic vinyl unit content of from 5 to 20 mass %, and a weight average molecular weight of from 500 to 15000;

step B: mixing the polymer block A with a monomer mixture containing an aromatic vinyl and 1,3-butadiene and continuing polymerization reaction so as to form a polymer block B having an active terminal continuously with the polymer block A to thereby obtain conjugated diene-based polymer chain having an active terminal, the conjugated diene-based polymer chain having the polymer block A and the polymer block B; and step C: reacting the active terminal of the conjugated diene-based polymer chain with polyorganosiloxane represented by Formula (1) described later.

(2) The rubber composition for tires, further including aromatic modified terpene resin having a softening point of from 100 to 150° C., in which the above described (1) rubber composition for a tire with the content of the aromatic modified terpene resin is from 1 to 50 parts by mass per 100 parts by mass of the diene-based rubber.

(3) A pneumatic tire configured so that the rubber composition for a tire according to the (1) or (2) is arranged in a cap tread.

As described below, according to the present technology, it is possible to provide a rubber composition for a tire having a low viscosity, an excellent workability, an excellent wear resistance, wet performance and low rolling resistance, when formed into a tire; and possible to provide a pneumatic tire using the above mentioned rubber composition for a tire.

Note that having an excellent wet performance when formed into a tire may simply be referred to as "excellent wet performance". Further, having an excellent low rolling resistance when used as a tire may simply be referred to as "excellent low rolling resistance".

BRIEF DESCRIPTION OF DRAWINGS

FIG. 1 is a partial cross-sectional schematic view of a tire that illustrates one example of a pneumatic tire of the present technology.

DETAILED DESCRIPTION

A rubber composition for a tire of the present technology and a pneumatic tire using the rubber composition for a tire of the present technology will be described, below.

A numerical range represented using "(from) . . . to . . . " used herein refers to a range including a numerical values preceding "to" as a lower limit value and a numerical value following "to" as an upper limit value, respectively. Rubber composition for tire The rubber composition for a tire of the present technology (hereinafter, may also be referred to as "composition of the present technology") contains a diene-based rubber and a silica.

Here, the diene-based rubber contains natural rubber and specific conjugated diene-based rubber, the content of the natural rubber in the diene-based rubber is from 30 to 45 mass %, and the content of the specific conjugated diene-based rubber in the diene-based rubber is from 30 to 70 mass %.

Further, the specific conjugated diene-based rubber is conjugated diene-based rubber produced according to a method of producing conjugated diene-based rubber including later-described steps of A, B, and C in this order. The conjugated diene-based rubber is configured so that the aromatic vinyl unit content is from 38 to 48 mass %, the vinyl bond content is from 20 to 35 mass %, and the weight average molecular weight is 500000 to 800000.

Further, a CTAB adsorption specific surface area of the silica is 180 m$^2$/g or greater, and the content of the silica is less than 60 parts by mass per 100 parts by mass of the diene-based rubber.

The composition of the present technology has such a constitution, thus exhibiting low viscosity, an excellent workability, wet performance and a low rolling resistance when formed into a tire. Although the reason for this is unknown, the reason is presumed to be as follows.

As described above, it is known that when the silica is compounded, a characteristic such as a low rolling resistance is improved. Generally, silica having a large surface area is expected to have an effective silica compounding; however, this easily leads to cohesiveness of silica and thus, a problem such as a reduction in effect and worsening of workability may easily arise.

On the other hand, in the present technology, the natural rubber and the specific conjugated diene-based rubber are used in combination, and thus, it is assumed that an effect obtained by compounding the silica having a large surface area as described above is sufficiently provided.

That is, the specific conjugated diene-based rubber contained in the composition of the present technology is obtained by forming a rubber-based polymer block B in a polymer block A formed by polymerization with isoprene and further reacting with specific polyorganosiloxane. Here, an isoprene unit content in the polymer block is high and the specific conjugated diene-based rubber resembles in structure of natural rubber, and this allows a high-level of compatibility with the natural rubber contained in the composition. On the other hand, the polyorganosiloxane in the specific conjugated diene-based rubber has a strong affinity with the silica in the composition. This suppresses the cohesiveness of the silica in the composition, resulting in a state where the silica is dispersed at a high level in the composition. That is, the specific conjugated diene-based rubber functions as a rubber component, and functions also as a good silica dispersant. As a result, the composition of the present technology may be capable of exhibiting the above-described effects (viscosity, workability, wet performance, and low rolling resistance). This may be explained from the later-described example as when the natural rubber is not contained (Comparative Example 1), it is assumed not to be able to obtain a desired effect.

Respective components contained in the composition of the present technology will be described in detail, below.
Diene-based Rubber The diene-based rubber contained in the composition of the present technology contains natural rubber and specific conjugated diene-based rubber.
Natural Rubber The natural rubber contained in the diene-based rubber is not particularly limited.

The content of the natural rubber in the diene-based rubber is from 30 to 45 mass %. In particular, the content preferably is from 35 to 40 mass %.

When the content of the natural rubber is less than 30 mass %, wearability is insufficient. Further, when the content of the natural rubber exceeds 45 mass %, the viscosity is high and the workability and low rolling resistance become insufficient.

Note that "the content of the natural rubber in the diene-based rubber" refers to the content (mass %) of the natural rubber relative to a whole of the diene-based rubber.
Specific Conjugated Diene-based Rubber As described above, the specific conjugated diene-based rubber is a conjugated diene-based rubber produced according to a method of producing conjugated diene-based rubber including the later-described steps of A, B, and C in this order. The conjugated diene-based rubber is configured so that the aromatic vinyl unit content is from 38 to 48 mass %, the vinyl bond content is from 20 to 35 mass %, and the weight average molecular weight is 500000 to 800000.

step A: polymerizing a monomer mixture containing isoprene and aromatic vinyl to form a polymer block A having an active terminal where an isoprene unit content is from 80 to 95 mass %, the aromatic vinyl unit content is from 5 to 20 mass %, and the weight average molecular weight is from 500 to 15000;

step B: mixing the polymer block A with a monomer mixture containing an aromatic vinyl and 1,3-butadiene to continue polymerization reaction so as to form a polymer block B having an active terminal continuously with the polymer block A to thereby obtain conjugated diene-based polymer chain having an active terminal with the polymer block A and the polymer block B; and step C: reacting the active terminal of the conjugated diene-based polymer chain with polyorganosiloxane represented by Formula (1) described later.

Each step will be described in detail, below.
Step A

In step A: a monomer mixture containing isoprene and aromatic vinyl is polymerized to form a polymer block A having an active terminal where an isoprene unit content is from 80 to 95 mass %, the aromatic vinyl unit content is from 5 to 20 mass %, and the weight average molecular weight is from 500 to 15000.

The monomer mixture may only be isoprene and aromatic vinyl, or may contain a monomer other than the isoprene and the aromatic vinyl.

The aromatic vinyl is not particularly limited; however examples thereof may include styrene, α-methyl styrene, 2-methyl styrene, 3-methyl styrene, 4-methyl styrene, 2-ethylstyrene, 3-ethyl styrene, 4-ethyl styrene, 2,4-diisopropylstyrene, 2,4-dimethyl styrene, 4-t-butyl styrene, 5-t-butyl-2-methylstyrene, vinyl naphthalene, dimethylaminomethylstyrene, and dimethylaminoethylstyrene. In particular, styrene is preferred. These aromatic vinyls may be used singly or in a combination of two or more types thereof.

Examples of the monomers other than the isoprene and the aromatic vinyl may include conjugated diene other than isoprene such as 1,3-butadiene, 2,3-dimethyl-1,3-butadiene, 2-chloro-1,3-butadiene, 1,3-pentadiene, and 1,3-hexadiene; α- and β-unsaturated nitriles such as acrylonitrile and methacrylonitrile; unsaturated carboxylic acids or acid anhydrides such as acrylic acid, methacrylic acid, and maleic anhydride; unsaturated carboxylates such as methylmethacrylate, ethylacrylate, and butylacrylate; and non-conjugated dienes such as 1,5-hexadiene, 1,6-heptadiene, 1,7-octadiene, dicyclopentadiene, and 5-ethylidene-2-norbornene. In particular, 1,3-butadiene is preferred. These may be used singly or in a combination of two or more types thereof.

The monomer mixture preferably is polymerized in an inert solvent.

The inert solvent is not particularly limited as long as the inert solvent is one normally used in solution polymerization and does not hinder the polymerization reaction. Specific examples thereof include chain aliphatic hydrocarbons such as butane, pentane, hexane, heptane, and 2-butene, alicyclic hydrocarbons such as cyclopentane, cyclohexane, and cyclohexene, aromatic hydrocarbons such as benzene, toluene, and xylene. A usage amount of the inert solvent, in terms of monomer mixture concentration, is from 1 to 80 mass % and preferably from 10 to 50 mass %.

The above monomer mixture preferably is polymerized with a polymerization initiator.

The polymerization initiator is not particularly limited as long as the polymerization initiator polymerizes the monomer mixture containing isoprene and aromatic vinyl so as to provide a polymer chain having an active terminal. Specific examples preferably used are polymerization initiators containing, as a primary catalyst, an organic alkali metal compound, an organic alkali earth metal compound, a lanthanide series metal compound, and the like. Examples of the organic alkali metal compound include an organic monolithium compound such as n-butyllithium, sec-butyllithium, t-butyllithium, hexyl lithium, phenyl lithium, and stilbene lithium; an organic poly-lithium compound such as dilithiomethane, 1,4-dilithiobutane, 1,4-dilithio-2-ethylcyclohexane, 1,3,5-trilithiobenzene, and 1,3,5-tris(lithiomethyl)benzene; an organic sodium compound such as sodium naphthalene; and an organic potassium compound such as potassium naphthalene. Further, examples of the organic alkali earth metal compound include di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, and diketylbarium. Examples of the polymerization initiators having, as a primary catalyst, a lanthanide series metal compound include polymerization initiators containing a primary catalyst of a lanthanide series metal salt containing a lanthanide series metal such as lanthanum, cerium, praseodymium, neodymium, samarium, and gadolinium, and a carboxylic acid or phosphorus-containing organic acid, together with a promoter such as an alkylaluminum compound, organoaluminum hydride compound, or organoaluminum halide compound. Among these polymerization initiators, the organic monolithium compound is preferably used, and the n-butyllithium is more preferably used. Further, the organic alkali metal compound may be used as an organic alkali metal amide compound obtained by reaction, in advance, with a secondary amine such as dibutylamine, dihexylamine, dibenzylamine, pyrrolidine, hexamethyleneimine, and heptamethyleneimine. These polymerization initiators may be used singly or in a combination of two or more types thereof.

A usage amount of the polymerization initiator may be determined according to a targeted molecular weight but is preferably in the range of from 4 to 250 mmol, more preferably from 6 to 200 mmol, and particularly preferably from 10 to 70 mmol per 100 g of the monomer mixture.

A polymerization temperature when the monomer mixture is polymerized is, for example, in the range of from −80 to +150° C., preferably from 0 to 100° C., and more preferably from 20 to 90° C.

A polymerization form may take any mode such as batch and continuous. In addition, it may be possible to take, as a bonding form, various bonding forms such as block-like and tapered.

A method of adjusting the 1,4-bond content in the isoprene unit in the polymer block A may include that in which a polar compound is added to the inert solvent at the time of the polymerization and the addition is adjusted in amount, for example. Examples of the polar compound include ether compounds such as dibutylether, tetrahydrofuran, and 2,2-di(tetrahydrofuryl)propane; tertiary amines such as tetramethylethylenediamine; alkali metal alkoxides; and phosphine compounds. Among these, an ether compound and a tertiary amine are preferred, among which those capable of forming a chelate structure with a metal of the polymerization initiator are more preferred, and 2,2-di(tetrahydrofuryl)propane and tetramethylethylenediamine are particularly preferred.

A usage amount of the polar compound may be determined according to a targeted 1,4-bond content but is preferably from 0.01 to 30 mol and more preferably from 0.05 to 10 mol per 1 mol of the polymerization initiator. When the usage amount of the polar compound is within this range, it is easy to adjust the 1,4-bond content in the isoprene unit, and problems due to deactivation of the polymerization initiator is less likely to occur.

An amount of the 1,4-bond content in the isoprene unit in the polymer block A is preferably from 10 to 95 mass %, and more preferably from 20 to 95 mass %.

Note that the amount of the 1,4-bond content in the isoprene unit as used herein indicates a proportion (mass %) of the unit of 1,4-bond isoprene relative to a whole of the isoprene contained in the polymer block A.

The weight average molecular weight (Mw) of the polymer block A is 500 to 15000 as a value in terms of polystyrene measured by gel permeation chromatography (GPC). In particular, the molecular weight is preferably from 1000 to 12000, and more preferably from 1500 to 10000.

When the weight average molecular weight of the polymer block A is less than 500, a desired reduced heat build-up and wet performance are less likely to be observed.

When the weight average molecular weight of the polymer block A exceeds 15000, a balance between the desired low rolling and a viscoelastic property that acts as an index of a wet performance may be collapsed.

A molecular weight distribution, which is expressed as a ratio (Mw/Mn) of the weight average molecular weight (Mw) of the polymer block A relative to the number average molecular weight (Mn) thereof, is preferably from 1.0 to 1.5 and more preferably from 1.0 to 1.3. When this value of molecular weight distribution (Mw/Mn) of the polymer block A is within the above range, the specific conjugated diene-based rubber (A) is more easily produced. Note that Mw and Mn are both values in terms of polystyrene measured by GPC.

The isoprene unit content of the polymer block A is 80 to 95 mass %. In particular, the unit content preferably is from 85 to 95 mass %.

The aromatic vinyl unit content of the polymer block A is 5 to 20 mass %. In particular, the unit content preferably is from 5 to 15 mass %, and more preferably from 5 to 13 mass %.

The content of the monomer unit other than the isoprene unit and the aromatic vinyl unit, of the polymer block A, is preferably 15 mass % or less, more preferably 10 mass % or less, and even more preferably 6 mass % or less.

Step B

In step B, the polymer block A formed in the above-described step A is mixed with a monomer mixture containing 1,3-butadiene and an aromatic vinyl to continue polymerization reaction so as to form a polymer block B having an active terminal continuously with the polymer block A to thereby obtain a conjugated diene-based polymer chain having an active terminal with the polymer block A and the polymer block B.

A specific example and a preferred aspect of the aromatic vinyl are as described above.

The monomer mixture preferably is polymerized in an inert solvent.

The definition, a specific example, and a preferred aspect of the inert solvent are as described above.

A usage amount of the polymer block A having an active terminal that is used to form the polymer block B may be determined according to a targeted molecular weight; however, the amount is in the range of from 0.1 to 5 mmol, preferably from 0.15 to 2 mmol, and more preferably from 0.2 to 1.5 mmol per 100 g of a monomer mixture containing 1,3-butadiene and aromatic vinyl, for example.

A method of mixing the polymer block A and the monomer mixture containing 1,3-butadiene and aromatic vinyl is not particularly limited. The polymer block A having an active terminal may be added to a solution of a monomer mixture containing 1,3-butadiene and aromatic vinyl. Further, the monomer mixture containing 1,3-butadiene and aromatic vinyl may be added to a solution of the polymer block A having an active terminal. From the perspective of controlling polymerization, the polymer block A having an active terminal is preferably added to a solution of a monomer mixture containing 1,3-butadiene and aromatic vinyl.

A polymerization temperature when the monomer mixture containing 1,3-butadiene and aromatic vinyl is polymerized is in the range of from −80 to +150° C., preferably from 0 to 100° C., and more preferably from 20 to 90° C., for example. A polymerization form may take any mode such as batch and continuous. In particular, the batch mode is preferable.

It may be possible to take, as a form to bond each monomer of the polymer block B, various bonding forms such as block-like, tapered, and random. Among these, random bonding is preferred. When the random bonding form is selected as a form to bond the 1,3-butadiene and the aromatic vinyl, in order that, in the polymerization system, a ratio of the aromatic vinyl relative to a total amount of the 1,3-butadiene and the aromatic vinyl is not too high, the 1,3-butadiene and the aromatic vinyl are preferably supplied to the polymerization system continuously or intermittently.

The 1,3-butadiene unit content of the polymer block B is not particularly limited; however, the content is preferably from 55 to 95 mass % and even more preferably from 55 to 90 mass %.

The aromatic vinyl unit content of the polymer block B is not particularly limited; however, the content is preferably from 5 to 45 mass % and even more preferably from 10 to 45 mass %.

For the polymer block B, other than the 1,3-butadiene unit and the aromatic vinyl unit, another monomer unit may be further used. Another monomer used for constituting the other monomer unit may include that which is obtained by removing the 1,3-butadiene from the above-described "example out of monomers other than isoprene, with the exception of aromatic vinyl", and isoprene.

The content of the other monomer unit of the polymer block B is preferably 50 mass % or less, more preferably 40 mass % or less, and even more preferably 35 mass % or less.

To adjust a vinyl bond content in the 1,3-butadiene unit in the polymer block B, it is preferable to add the polar compound to the inert solvent at the time of the polymerization. However, the polar compound does not have to be newly added if the polar compound has been added to the inert solvent in an amount sufficient to adjust the vinyl bond content in the 1,3-butadiene monomer unit of the polymer block B at the time of the preparation of the polymer block A. A specific example of the polar compound used to adjust the vinyl bond content is similar to that of the polar compound used for the formation of the polymer block A described above. A usage amount of the polar compound may be determined according to a targeted vinyl bond content but is preferably from 0.01 to 100 mol, and more preferably from 0.1 to 30 mol per 1 mol of the polymerization initiator. When the usage amount of the polar compound is within this range, it is easy to adjust the vinyl bond content in the 1,3-butadiene unit, and a problem caused due to deactivation of the polymerization initiator tends not to occur.

The vinyl bond content in the 1,3-butadiene unit of the polymer block B is preferably from 10 to 90 mass %, more preferably from 20 to 80 mass %, and particularly preferably from 25 to 70 mass %.

As a result of the steps A and B, it is possible to obtain the conjugated diene-based polymer chain, having an active terminal, with the polymer block A and the polymer block B.

From the perspective of productivity, the conjugated diene-based polymer chain having the active terminal is preferably composed of a polymer block A-polymer block B, and the terminal of the polymer block B is preferably an active terminal. However, the conjugated diene-based polymer chain may have a plurality of polymer blocks A and may also have another polymer block. Examples thereof include a conjugated diene-based polymer chain having an active terminal such as a block composed only of a polymer block A-polymer block B-polymer block A and a polymer block A/polymer block B/isoprene. When a block composed only of isoprene is formed on the active terminal side of the conjugated diene-based polymer chain, a usage amount of the isoprene is preferably from 10 to 100 mol, more preferably from 15 to 70 mol, and particularly preferably from 20 to 35 mol per 1 mol of the polymerization initiator used in the first polymerization reaction.

A mass ratio of the polymer block A and the polymer block B in the conjugated diene-based polymer chain having an active terminal (when there are a plurality of polymer blocks A and B, the mass ratio is based on the total mass of the respective blocks) is preferably from 0.001 to 0.1, more preferably from 0.003 to 0.07, and particularly preferably from 0.005 to 0.05 in terms of (mass of polymer block A)/(mass of polymer block B).

A molecular weight distribution, which is expressed as a ratio (Mw/Mn) of the weight average molecular weight (Mw) to the number average molecular weight (Mn) of the conjugated diene-based polymer chain having an active terminal, is preferably from 1.0 to 3.0, more preferably from 1.0 to 2.5, and particularly preferably from 1.0 to 2.2. When the value of the molecular weight distribution (Mw/Mn) of the conjugated diene-based polymer chain having an active terminal is within the above range, the specific conjugated diene-based rubber is easy to be produced. Note that Mw and Mn are both values in terms of polystyrene measured by GPC.

In the conjugated diene-based polymer chain having the active terminal, it is preferable that a sum content of the isoprene unit and the 1,3-butadiene unit is 50 to 99.995 mass % and the content of the aromatic vinyl unit is 0.005 to 50 mass %, it is more preferable that a sum content of the isoprene and the 1,3-butadiene unit is 55 to 95 mass % and the content of the aromatic vinyl is 5 to 45 mass %, and it is even more preferable that a sum content of the isoprene unit and the 1,3-butadiene unit is 55 to 90 mass % and the content of the aromatic vinyl is 10 to 45 mass %. In addition, the vinyl bond content in the isoprene unit and the 1,3-butadiene unit of the conjugated diene-based polymer chain having an active terminal is similar to the vinyl bond content in the 1,3-butadiene unit of the polymer block B described above.

Step C

Step C is a step of reacting the active terminal of the conjugated diene-based polymer chain obtained in step B with the polyorganosiloxane represented by following Formula (1).

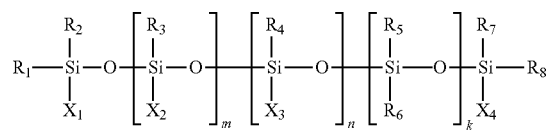

Formula (1)

In Formula (1) above, $R_1$ to $R_8$, which are alkyl groups having from 1 to 6 carbons or aryl groups having from 6 to 12 carbons, are the same or different. $X_1$ and $X_4$ are any group selected from the group consisting of alkyl groups having from 1 to 6 carbons, aryl groups having from 6 to 12 carbons, alkoxy groups having from 1 to 5 carbons, and epoxy group-containing groups having from 4 to 12 carbons, and these may be the same or different. $X_2$ is an alkoxy group having from 1 to 5 carbons or an epoxy group-containing group having from 4 to 12 carbons, and a plurality of $X_2$ moieties may be the same as or different from one another. $X_3$ is a group containing from 2 to 20 repeating alkylene glycol units, and when there are a plurality of $X_3$ moieties, they may be the same as or different from one another. m is an integer from 3 to 200, n is an integer from 0 to 200, and k is an integer from 0 to 200.

Examples of the alkyl groups having from 1 to 6 carbons represented by $R_1$ to $R_8$, $X_1$, and $X_4$ in the polyorganosiloxanes expressed by Formula (1) above include a methyl group, an ethyl group, an n-propyl group, an isopropyl group, a butyl group, a pentyl group, a hexyl group, a cyclohexyl group, and the like. Examples of the aryl groups having from 6 to 12 carbons include a phenyl group, a methylphenyl group, and the like. Among these, a methyl group and an ethyl group are preferred from the perspective of production of the polyorganosiloxane itself.

Examples of the alkoxyl groups having from 1 to 5 carbons represented by $X_1$, $X_2$, and $X_4$ in the polyorganosiloxanes expressed by Formula (1) above include a methoxy group, an ethoxy group, a propoxy group, an isopropoxy group, a butoxy group, and the like. Above all, a methoxy group and an ethoxy group are preferred from the perspective of reactivity with the active terminal of the conjugated diene-based polymer chain.

Examples of the epoxy group-containing groups having from 4 to 12 carbons represented by $X_1$, $X_2$, and $X_4$ in the polyorganosiloxanes represented by Formula (1) above include groups represented by Formula (2) below.

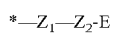

Formula (2)

In Formula (2) above, $Z_1$ is an alkylene group or an alkyl arylene group having from 1 to 10 carbons; $Z_2$ is a methylene group, a sulfur atom, or an oxygen atom; and E is an epoxy group-containing hydrocarbon group having from 2 to 10 carbons. In Formula (2) above, * indicates a bond position.

In the groups represented by Formula (2) above, preferably, $Z_2$ is an oxygen atom; more preferably, $Z_2$ is an oxygen atom and E is a glycidyl group; and particularly preferably, $Z_1$ is an alkylene group having from 1 to 3 carbons, $Z_2$ is an oxygen atom, and E is a glycidyl group.

In the polyorganosiloxane expressed by Formula (1) above, preferably, $X_1$ and $X_4$ are epoxy group-containing groups having from 4 to 12 carbons or alkyl groups having from 1 to 6 carbons among the above, and preferably, $X_2$ is an epoxy group-containing group having from 4 to 12 carbons among the above. More preferably, $X_1$ and $X_4$ are alkyl groups having from 1 to 6 alkyl groups and $X_2$ is an epoxy group-containing group having from 4 to 12 carbons.

In the polyorganosiloxane represented by Formula (1) above, a group represented by Formula (3) below is preferred as $X_3$, that is, a group containing from 2 to 20 repeating alkylene glycol units.

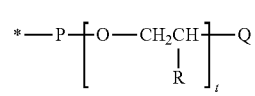

Formula (3)

In Formula (3) above, t is an integer from 2 to 20, P is an alkylene group or an alkyl arylene group having from 2 to 10 carbons, R is a hydrogen atom or a methyl group, and Q is an alkoxy group or an aryloxy group having from 1 to 10 carbons. In Formula (3) above, * indicates a bond position. Among these, preferably, t is an integer of from 2 to 8, P is an alkylene group having 3 carbons, R is a hydrogen atom, and Q is a methoxy group.

In the polyorganosiloxanes represented by Formula (1) above, m is an integer of from 3 to 200, preferably an integer of from 20 to 150, and more preferably an integer of from 30 to 120. m is an integer of three or greater, and thus, the specific conjugated diene-based rubber has a high affinity with silica. As a result, the tire obtained from the composition of the present technology provides an excellent reduced heat build-up. Further, m is an integer of 200 or less, and thus, it is easy to produce the polyorganosiloxane itself and the viscosity of the composition of the present technology is decreased.

In the polyorganosiloxanes represented by Formula (1) above, n is an integer of from 0 to 200, preferably an integer of from 0 to 150, and more preferably an integer of from 0 to 120. Further, in the polyorganosiloxanes represented by Formula (1) above, k is an integer of from 0 to 200, preferably an integer of from 0 to 150, and more preferably an integer of from 0 to 130.

In the polyorganosiloxanes represented by Formula (1) above, the total of m, n, and k is preferably from 3 to 400, more preferably from 20 to 300, and particularly preferably from 30 to 250.

Note that in the polyorganosiloxane represented by Formula (1) above, it is thought that when the epoxy groups in the polyorganosiloxane react with the active terminal of the conjugated diene polymer chain, at least some of the epoxy groups in the polyorganosiloxane are ring-opened so that bonds are formed between the carbon atoms of the portion where the epoxy groups are ring-opened and the active terminal of the conjugated diene-based polymer chain. In addition, it is thought that when the alkoxy groups in the polyorganosiloxane react with the active terminal of the conjugated diene-based polymer chain, at least some of the alkoxy groups in the polyorganosiloxane are desorbed so that bonds are formed between the silicon atoms in the polyorganosiloxane to which the desorbed alkoxy groups were bonded and the active terminal of the conjugated diene-based polymer chain.

A usage amount of the polyorganosiloxane (hereinafter, may be referred to as modifying agent) is preferably an amount so that a ratio of the total number of moles of epoxy groups and alkoxy groups in the modifying agent per 1 mol of the polymerization initiator used for the polymerization is in the range of from 0.1 to 1, more preferably an amount so that the ratio is in the range of from 0.2 to 0.9, and even more preferably an amount so that the ratio is in the range of from 0.3 to 0.8.

In a method of producing the conjugated diene-based rubber of the present technology, in addition to modifying the conjugated diene-based polymer chain having an active terminal with the modifying agent described above, the active terminal of part of the conjugated diene-based polymer chain may be inactivated within a range that does not inhibit the effect of the present technology by adding, for example, a polymerization terminator, a polymerization terminal modifying agent other than the modifying agent described above, and a coupling agent to the polymerization system. That is, in the specific conjugated diene-based rubber, the active terminal of part of the conjugated diene-based polymer chain may be inactivated within a range that does not inhibit the effect of the present technology with a polymerization terminator, a polymerization terminal modifying agent other than the modifying agent described above, and a coupling agent.

Examples of the polymerization terminal modifying agent and coupling agent used in this case include N-substituted cyclic amines such as N-methyl-2-pyrrolidone, N-vinyl-2-pyrrolidone, N-phenyl-2-pyrrolidone, and N-methyl-ε-caprolactam; N-substituted cyclic ureas such as 1,3-dimethylethylene urea and 1,3-diethyl-2-imidazolidinone; N-substituted aminoketones such as 4,4'-bis(dimethylamino)benzophenone and 4,4'-bis(diethylamino)benzophenone; aromatic isocyanates such as diphenylmethane diisocyanate and 2,4-tolylene diisocyanate; N,N-di-substituted aminoalkylmethacrylamides such as N,N-dimethylaminopropylmethacrylamide; N-substituted aminoaldehydes such as 4-N,N-dimethylaminobenzaldehyde; N-substituted carbodiimides such as dicyclohexylcarbodiimide; Schiff bases such as N-ethylethylidene imine and N-methylbenzylidene imine; pyridyl group-containing vinyl compounds such as 4-vinylpyridine; halogenated silicon compounds such as tin tetrachloride, silicon tetrachloride, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane; and the like. A tire obtained by using a highly branched conjugated diene-based rubber obtained by additionally using, as a coupling agent, a halogenated silicon compound having five or more silicon-halogen atomic bonds in a single molecule, provides an excellent driving stability. One type of these polymerization terminal modifying agents and coupling agents may be used singly or a combination of two or more types thereof may be used.

When the modifying agent described above is reacted with the active terminal of the conjugated diene-based polymer chain, the modifying agent is preferably added to a solution containing the conjugated diene-based polymer chain having an active terminal, and from the perspective of achieving a good reaction control, it is more preferable to dissolve the modifying agent or the like in the inert solvent before adding to the polymerization system. The solution concentration is preferably in the range from 1 to 50 mass %.

The timing of adding the modifying agent and the like is not particularly limited, but it is desirable to add the modifying agent and the like to a solution in a state in which the polymerization reaction is not complete in the conjugated diene-based polymer chain having an active terminal, and a solution containing the conjugated diene-based polymer chain having an active terminal also contains a monomer— more specifically, in a state in which a solution containing the conjugated diene-based polymer chain having an active terminal contains a monomer in an amount of preferably not less than 100 ppm and more preferably from 300 to 50000 ppm. By adding the modifying agent and the like in this way, it is possible to control the reaction well by suppressing side reactions between the conjugated diene-based polymer chain having an active terminal and impurities contained in the polymerization system.

As the conditions for reacting the modifying agent and the like with the active terminal of the conjugated diene-based polymer chain, the temperature is, for example, in the range of from 0 to 100° C. and preferably from 30 to 90° C., and the reaction time of each is, for example, in the range of from 1 to 120 minutes and preferably from 2 to 60 minutes.

After the modifying agent or the like is reacted with the active terminal of the conjugated diene-based polymer chain, it is preferable that a polymerization terminator, that is, an alcohol such as methanol and isopropanol or water, is added to inactivate an unreacted active terminal.

After the active terminal of the conjugated diene-based polymer chain is deactivated, anti-aging agents such as phenol-based stabilizers, phosphorus-based stabilizers, and sulfur-based stabilizers, crumbling agents, antiscale agents, and the like are added, as desired, to the polymerization solution, and then the polymerization solvent is separated from the polymerization solution by direct drying or steam stripping, to recover the specific conjugated diene-based rubber obtained. Note that before separating the polymerization solvent from the polymerization solution, extender oil may be added to the polymerization solution to recover, as an oil-extended rubber, the specific conjugated diene-based rubber.

Examples of the extender oil used when recovering the specific conjugated diene-based rubber as an oil-extended rubber include paraffin-based, aromatic, and naphthene-based petroleum-based softeners, vegetable-based softeners, fatty acids, and the like. When the petroleum-based softener is used, the content of polycyclic aromatic extracted by the method of IP346 (test method of the Institute of Petroleum in the UK) is preferably less than 3%. When the extender oil is used, the usage amount is from 5 to 100 parts by mass, preferably from 10 to 60 parts by mass, and more preferably from 20 to 50 parts by mass, per 100 parts by mass of the conjugated diene-based rubber.

It is preferable for the specific conjugated diene-based rubber to contain from 5 to 40 mass %, more preferable to contain from 5 to 30%, and particularly preferable to contain from 10 to 20% of a structure obtained by bonding three or more conjugated diene-based polymer chains formed by reacting the conjugated diene-based polymer chain with an active terminal with the above mentioned polyorganosiloxane (below, "the structure with three or more conjugated diene-based polymer chains that is formed by reacting the conjugated diene-based polymer chain with an active terminal with the above mentioned polyorganosilaxane" may be referred to as a "structure having three or more bonds of conjugated diene-based polymer chains"). When the proportion of the structures having three or more bonds of conjugated diene-based polymer chains is within the range described above, the coagulability and drying properties at the time of production are enhanced, and when silica is compounded with the conjugated diene-based rubber, it is possible to provide a rubber composition for a tire having superior workability and a tire having superior reduced heat build-up. Note that the proportion of the structures having three or more bonds of conjugated diene-based polymer chains to the total amount of the specific conjugated diene-based rubber that is ultimately obtained (mass fraction) is expressed as the coupling ratio of three or more branches of conjugated diene-based polymer chains. This coupling ratio may be measured by gel permeation chromatography (in terms of polystyrene). From the chart obtained by gel permeation chromatography measurement, the ratio of the area of the peak portion having a peak top molecular weight 2.8 or greater times the peak top molecular weight indicated by the peak of smallest molecular weight to the total elution area is taken as the coupling ratio of three or more branches of the conjugated diene-based polymer chain.

The aromatic vinyl unit content of the specific conjugated diene-based rubber is from 38 to 48 mass %. In particular, in order to ensure that the present technology provides a better effect, the content is preferably from 40 to 45 mass %. When the aromatic vinyl unit content is less than 38 mass %, the wet performance is insufficient. Further, when the aromatic vinyl unit content exceeds 48 mass %, the low rolling resistance is worsened.

The vinyl bond content of the specific conjugated diene-based rubber is from 20 to 35 mass %. In particular, in order to ensure that the present technology provides a better effect, the content is preferably from 25 to 30 mass %. When the vinyl bond content is less than 20 mass %, the low rolling resistance is worsened. Further, when the vinyl bond content exceeds 35 mass %, the viscosity increases and the workability is worsened. Note that the vinyl bond content means a proportion (mass %) of the vinyl bond relative to a conjugated diene unit contained in the specific conjugated diene-based rubber.

Note that the weight average molecular weight (Mw) of the specific conjugated diene-based rubber is 500000 to 800000 as a value in terms of polystyrene measured by gel permeation chromatography (GPC). In particular, in order to ensure that the present technology provides a better effect, the weight is preferably from 600000 to 700000. When the weight average molecular weight is less than 500000, a wearability performance is worsened. Further, when the weight average molecular weight exceeds 800000, the workability is worsened.

The molecular weight distribution, which is expressed as the ratio (Mw/Mn) of the weight average molecular weight (Mw) to the number average molecular weight (Mn) of the specific conjugated diene-based rubber, is preferably from 1.1 to 3.0, more preferably from 1.2 to 2.5, and particularly preferably from 1.2 to 2.2. Note that Mw and Mn are both values in terms of polystyrene measured by GPC.

The Mooney viscosity ($ML_{1+4}$, 100° C.) of the specific conjugated diene-based rubber preferably is from 20 to 100, more preferably is from 30 to 90, and even more preferably is 35 to 80. Note that when the specific conjugated diene-based rubber is obtained as an oil-extended rubber, the Mooney viscosity of that oil-extended rubber is preferably the same as the ranges above.

The content of the specific conjugated diene-based rubber in the natural rubber is from 30 to 70 mass %. In particular, the content is preferably from 40 to 65 mass %.

When the content of the specific conjugated diene-based rubber is less than 30 mass %, the viscosity is high, and the workability, the wet performance, and the low rolling resistance become insufficient. Further, when the content of the specific conjugated diene-based rubber exceeds 70 mass %, the workability and the wet performance become insufficient.

Note that the "content of the specific conjugated diene-based rubber in the diene-based rubber" refers to the content (mass %) of the specific conjugated diene-based rubber relative to a whole of the diene-based rubber.

Other Rubber Components

The diene-based rubber may contain a rubber component besides the natural rubber and the specific conjugated diene-based rubber (other rubber components). Such another rubber component is not particularly limited, and examples thereof include an aromatic vinyl-conjugated diene copolymer, rubber other than a specific conjugated diene-based rubber, isoprene rubber (IR), butadiene rubber (BR) acrylonitrile-butadiene copolymer rubber (NBR), butyl rubber (IIR), halogenated butyl rubber (Br-IIR, Cl-IIR), chloroprene rubber (CR) and the like. Examples of the aromatic vinyl-conjugated diene copolymer rubber described above include styrene-butadiene copolymer rubber (SBR) other than the specific conjugated diene-based rubber, styrene-isoprene copolymer rubber, and the like. In particular, the SBR is preferable.

The unit content of the styrene unit in the SBR is not particularly limited, but preferably from 10 to 20 mass %.

Further, the vinyl bond content of the SBR is not particularly limited, but preferably from 25 to 35 mass %. Note that the vinyl bond content means a proportion (mass %) of the vinyl bond relative to a conjugated diene unit contained in the specific conjugated diene-based rubber.

Further, the glass transition temperature (Tg) is preferably from −60 to −70° C. Note that Tg was evaluated by using a differential scanning calorimetry (DSC) with a temperature rising rate of 20° C./min, in accordance with a midpoint method.

The content of the other rubber components in the diene-based rubber is not particularly limited, but is preferably from 1 to 30 mass %. Note that "the content of the other rubber components in the diene-based rubber" refers to the unit content (mass %) of the other rubber components relative to a whole of the diene-based rubber. Silica The silica contained in the composition of the present technology is not particularly limited as long as silica of which the cetyltrimethylammonium bromide (CTAB) specific surface area is 180 m²/g or greater is used, and it is possible to use any conventionally known silica that is compounded into a rubber composition in applications such as tires.

Examples of the silica include wet silica, dry silica, fumed silica, diatomaceous earth, and the like. One type of the silica may be used singly or two or more types of the silicas may be used in combination.

Note that when the CTAB adsorption specific surface area is less than 180 m²/g, the wet performance is insufficient.

An upper limit of the CTAB adsorption specific surface area is not particularly limited; however, the area is preferably 300 m²/g or less.

The CTAB adsorption specific surface area is preferably from 185 to 250 m²/g.

The CTAB adsorption specific surface area, as used herein, is the adsorbed amount of CTAB on the silica surface measured according to JIS (Japanese Industrial Standard) K6217-3:2001 "Part 3: Method for determining specific surface area—CTAB adsorption method."

In the composition of the present technology, the content of the silica is less than 60 parts by mass per 100 parts by mass of the diene-based rubber. In particular, the content preferably is from 30 to 50 parts by mass, and more preferably 40 parts by mass or greater.

When the content of the silica is 60 parts by mass or greater per 100 parts by mass of the diene-based rubber, the viscosity is high and the workability and the low rolling resistance are insufficient.

Optional Components

The composition of the present technology may further contain another additive (optional component) as necessary within the scope that does not inhibit the effect or purpose thereof.

Examples of the optional component include various additives typically used in rubber compositions, such as carbon black, fillers, silane coupling agents, aromatic modified terpene resin, zinc oxide (zinc white), stearic acid, anti-aging agents, waxes, processing aids, oils, liquid polymers, thermosetting resins, vulcanizing agents (e.g. sulfur), and vulcanization accelerators.

Aromatic Modified Terpene Resin

The composition of the present technology may further contain aromatic modified terpene resin because of its superior wet performance.

The softening point of the aromatic modified terpene resin is not particularly limited; however, the softening point is preferably from 100 to 150° C. and more preferably from 100 to 130° C.

Note that the softening point is a Vicat softening point measured in accordance with JIS K7206:1999.

In the composition of the present technology, the content of the aromatic modified terpene resin is not particularly limited, but is preferably from 1 to 50 parts by mass, and more preferably from 2 to 20 parts by mass, per 100 parts by mass of the diene-based rubber described above.

Preparation Method of Rubber Composition for Tire

The method of producing the composition of the present technology is not particularly limited, and specific examples thereof include a method whereby each of the above-mentioned components is kneaded using a publicly known method and device (e.g. Banbury mixer, kneader, and roll). When the composition of the present technology contains a sulfur or a vulcanization accelerator, the components other than the sulfur and the vulcanization accelerator are preferably mixed first at a high temperature (preferably from 100 to 155° C.) and then cooled before the sulfur or the vulcanization accelerator is mixed.

In addition, the composition of the present technology can be vulcanized or crosslinked under conventional, publicly known vulcanizing or crosslinking conditions.

Pneumatic Tire

The pneumatic tire of the present technology is a pneumatic tire produced using the composition of the present technology described above. In particular, a pneumatic tire in which the composition of the present technology is arranged in a tire tread is preferable.

FIG. 1 is a partial cross-sectional schematic view of a tire that represents one embodiment of the pneumatic tire of the present technology, but the pneumatic tire of the present technology is not limited to the embodiment illustrated in FIG. 1.

In FIG. 1, reference sign 1 indicates a bead portion, reference sign 2 indicates a sidewall portion, and reference sign 3 indicates a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

Note that the tire tread portion 3 is formed by the composition of the present technology described above.

The pneumatic tire of the present technology can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present technology will be further described in detail with reference to examples; however, the present technology is not limited thereto. Production specific conjugated diene-based rubber In a nitrogen-purged 100 mL ampoule bottle, cyclohexane (35 g) and tetramethylethylenediamine (1.4 mmol) were added, and then n-butyllithium (4.3 mmol) was further added. Subsequently, isoprene (21.6 g) and styrene (3.1 g) were slowly added and reacted in an ampoule bottle of 50° C. for 120 minutes. As a result, the polymer block A having an active terminal was obtained. The polymer block A was measured in weight average molecular weight, molecular weight distribution, aromatic vinyl unit content, isoprene unit content, and 1,4-bond content. The measurement results are shown in Table 1.

Then, cyclohexane (4000 g), 1,3-butadiene (474.0 g), and styrene (126.0 g) were loaded in an autoclave equipped with a stirrer under a nitrogen atmosphere, and then the total amount of the resultant polymer block A having an active terminal was added, and polymerization was initiated at 50° C. After confirming that the rate of polymerization conversion was in the range from 95% to 100%, polyorganosiloxane A represented by Formula (4) below was added in a state of a xylene solution having a 20 mass % concentration for 30 minutes so that the content of the epoxy groups were 1.42 mmol (equivalent to 0.33 times the n-butyllithium used). After that, methanol in an amount equivalent to twice the number of moles of n-butyllithium used was added as a polymerization terminator, and a solution containing specific conjugated diene-based rubber was obtained. A small amount of anti-aging agent (IRGANOX 1520, manufactured by BASF) was added in this solution, and as an extender oil, 25 parts by mass of Fukko Luella Mick 30 (manufactured by Nippon Oil Corporation) were added per 100 parts by mass of the specific conjugated diene-based rubber. Then, solid rubber was recovered using a steam stripping process. The obtained solid rubber was dehydrated using a roll and dried in a dryer. Thus, the solid specific conjugated diene-based rubber was obtained.

Formula (4)

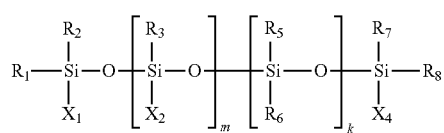

In Formula (4) above, each of $X_1$, $X_4$, $R_1$ to $R_3$, and $R_5$ to $R_8$ is a methyl group. In Formula (4) above, m is 80, and k is 120. In Formula (4) above, $X_2$ is a group represented by Formula (5) below (here, * indicates a bond position).

Formula (5)

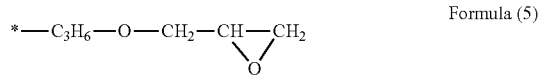

Note that the obtained specific conjugated diene-based rubber was measured in weight average molecular weight, molecular weight distribution, coupling ratio of three or more branches, aromatic vinyl unit content, vinyl bond content, and Mooney viscosity. The measurement results are shown in Table 2. The measurement method is as follows.

Weight average molecular weight, molecular weight distribution, and coupling ratio of three or more branches The weight average molecular weight, the molecular weight distribution, and the coupling ratio of three or more branches (the proportion (mass %) of the "structures having three or more bonds of conjugated diene-based polymer chains" relative to the specific conjugated diene-based rubber), were evaluated using a chart obtained by gel permeation chromatography based on molecular weight in terms of polystyrene. Note that specific measurement conditions of the gel permeation chromatography are described as follows.

Measurement instrument: HLC-8020 (manufactured by Tosoh Corp.)
Column: GMH-HR-H (manufactured by Tosoh Corp.), two connected in serial
Detector: Differential refractometer RI-8020 (manufactured by Tosoh Corp.)
Eluent: Tetrahydrofuran
Column temperature: 40° C.

Here, the coupling ratio of three or more branches is the ratio (s2/s1) of the area (s2) of the peak portion having a peak top molecular weight 2.8 or greater times the peak top molecular weight indicated by the peak of smallest molecular weight to the total elution area (s1).

Aromatic Vinyl Unit Content and Vinyl Bond Content

The aromatic vinyl unit content and the vinyl bond content were measured by $^1$H-NMR.

Mooney Viscosity

Mooney viscosity ($ML_{1+4}$, 100° C.)) was measured in accordance with JIS K6300-1:2013.

TABLE 1

| | Polymer block A |
|---|---|
| Weight average molecular weight | 8700 |
| Molecular weight distribution (Mw/Mn) | 1.10 |
| Aromatic vinyl unit content (mass %) | 12.6 |
| Isoprene unit content (mass %) | 87.4 |
| 1,4-bond content (mass %) | 58.0 |

TABLE 2

| | Specific conjugated diene-based rubber |
|---|---|
| Weight average molecular weight | 640000 |
| Molecular weight distribution (Mw/Mn) | 1.65 |
| Coupling ratio of three or more branches (mass %) | 12.5 |
| Aromatic vinyl unit content (mass %) | 42.6 |
| Vinyl bond content (mass %) | 29.5 |
| Mooney viscosity ($ML_{1+4}$, 100° C.) | 58 |

Production of Comparative Conjugated Diene-based Rubber 1

First, 4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N',N'-tetramethylethylenediamine were introduced into a nitrogen-purged autoclave reaction vessel having an internal capacity of 10 L. Then, agitation was begun. After the temperature of the content in the reaction vessel was adjusted to 50° C., 5.061 mL (7.945 mmol) of n-butyllithium was added. After the rate of polymerization conversion reached approximately 100%, 12.0 g of isoprene was further added and the mixture was reacted for 5 minutes. Then, 0.281 g (0.318 mmol) of a toluene solution containing 40 wt. % of 1,6-bis(trichlorosilyl)hexane was added and the mixture was reacted for 30 minutes. Further, the polyorganosiloxane A represented by Formula (4) above was added in a state of a xylene solution having a 20 mass % concentration for 30 minutes so that the content of the epoxy groups were 1.00 mmol (equivalent to 0.13 times the n-butyllithium used). Then, 0.5 mL of methanol was added and the mixture was agitated for 30 minutes. As a result, the conjugated diene-based rubber was obtained. A small amount of anti-aging agent (IRGANOX 1520, manufactured by BASF) was added in the resultant solution, and as an extender oil, 25 parts by mass of Fukko Luella Mick 30 (manufactured by Nippon Oil Corporation) were added per 100 parts by mass of the conjugated diene-based rubber. Then, solid rubber was recovered using a steam stripping process. The obtained solid rubber was dehydrated using a roll and dried in a dryer. Thus, the solid conjugated diene-based rubber was obtained. The obtained conjugated diene-based rubber was used as the comparative conjugated diene-based rubber 1. Preparation of rubber composition for a tire The components shown in Table 3 below were compounded in the proportions (parts by mass) shown in Table 3 below.

Specifically, a master batch was obtained by mixing the components shown in Table 3, excluding the sulfur and the vulcanization accelerator for 5 minutes in a 1.7 L closed-type Banbury mixer heated to a temperature near 150° C., and then discharging the mixture and cooling it to room temperature. The sulfur and vulcanization accelerator were then mixed into the resulting master batch using the Banbury mixer described above so as to obtain a rubber composition for a tire.

Note that in Table 3, regarding the amounts of the specific conjugated diene-based rubber and the comparative conjugated diene-based rubber 1, an upper value is an amount (unit: parts by mass) of rubber (oil extended product), and a lower value is a net rubber amount (unit: parts by mass).

Evaluation

The following evaluations were performed using the obtained rubber composition for a tire.

Viscosity

In accordance with a method in JIS K6300-1: 2013, the Mooney viscosity ($MK_{1+4}$) at 100° C. was measured. The results are shown in Table 3 (column of "viscosity" in Table 3). The results are displayed as an index when the Mooney viscosity of Standard Example 1 is defined as 100. The smaller the index, the smaller the viscosity.

Workability

Judging from a sheet skin and an edge state when a sheet was processed in two rolls, the evaluation was performed on the basis of the following references. The results are shown in Table 3 (column of "workability" in Table 3). Practically, A is preferable.

A: sheet skin is smooth with no edge cutting, hence no problem in workability

B: no edge cutting, but a poor sheet skin state

C: a poor sheet skin with an edge cutting generated, hence the sheet is easily cut Wet Performance A vulcanized rubber sheet was prepared by press-vulcanizing the obtained (unvulcanized) rubber composition for a tire for 20 minutes at 160° C. in a mold (15 cm×15 cm×0.2 cm).

The value of tan δ (0° C.) was measured for the prepared vulcanized rubber sheet with an elongation deformation distortion of 10%±2%, an oscillation frequency of 20 Hz, and a temperature of 0° C. using a viscoelastic spectrometer (produced by Toyo Seiki Seisaku-sho, LTD.) in accordance with JIS K6394:2007.

The results are shown in Table 3 (column of "wet performance" in Table 3). The results are displayed as an index when the value of tan δ (0° C.) of Standard Example 1 is defined as 100. Larger indexes indicate larger tan δ (0° C.) values, which in turn indicate excellent wet performance when formed into a tire.

Low Rolling Resistance

With an exception for the measurement condition at 60° C. rather than the measurement condition at 0° C., the value of tan δ (60° C.) was measured in much the same way as in the procedure for the wet performance.

The results are shown in Table 3 (column of "low rolling resistance" in Table 3). The results are displayed as an index when the value of tan δ (60° C.) of Standard Example 1 is defined as 100. Smaller index values indicate smaller tan δ (60° C.) values, which in turn indicate excellent low rolling resistance when used in a pneumatic tire.

TABLE 3

Table 3-1

|  | Standard Example 1 | Example 1 | Example 2 | Example 3 | Example 4 | Example 5 |
|---|---|---|---|---|---|---|
| Natural rubber | 40 | 40 | 30 | 40 | 40 | 40 |
| Specific conjugated diene-based rubber |  | 62.5 (50) | 62.5 (50) | 37.5 (30) | 62.5 (50) | 62.5 (50) |
| SBR | 10 | 10 | 20 | 30 | 10 | 10 |
| Comparative conjugated diene-based rubber 1 | 62.5 (50) |  |  |  |  |  |
| Silica | 50 | 50 | 50 | 50 | 50 | 30 |
| Comparative silica |  |  |  |  |  |  |
| Carbon black | 5 | 5 | 5 | 5 | 5 | 5 |
| Processing aid | 3 | 3 | 3 | 3 | 3 | 3 |
| Aromatic modified terpene resin |  |  |  |  | 5 |  |
| Zinc oxide | 3 | 3 | 3 | 3 | 3 | 3 |
| Stearic acid | 1 | 1 | 1 | 1 | 1 | 1 |
| Oil | 10 | 10 | 10 | 10 | 10 | 10 |
| Silane coupling agent | 4 | 4 | 4 | 4 | 4 | 2.4 |
| Sulfur | 2 | 2 | 2 | 2 | 2 | 2 |
| Vulcanization accelerator | 1 | 1 | 1 | 1 | 1 | 1 |
| Viscosity | 100 | 90 | 94 | 98 | 91 | 85 |
| Workability | B | A | A | A | A | A |
| Wet performance | 100 | 104 | 108 | 110 | 112 | 102 |
| Low rolling resistance | 100 | 94 | 94 | 99 | 95 | 91 |

TABLE 3-continued

Table 3-2

| | Comparative Example 1 | Comparative Example 2 | Comparative Example 3 | Comparative Example 4 |
|---|---|---|---|---|
| Natural rubber | | 60 | 40 | 40 |
| Specific conjugated diene-based rubber | 112.5 (90) | 37.5 (30) | 62.5 (50) | 62.5 (50) |
| SBR | 10 | 10 | 10 | 10 |
| Comparative conjugated diene-based rubber 1 | | | | |
| Silica | 50 | 50 | 70 | |
| Comparative silica | | | | 50 |
| Carbon black | 5 | 5 | 5 | 5 |
| Processing aid | 3 | 3 | 3 | 3 |
| Aromatic modified terpene resin | | | | |
| Zinc oxide | 3 | 3 | 3 | 3 |
| Stearic acid | 1 | 1 | 1 | 1 |
| Oil | | 15 | 10 | 10 |
| Silane coupling agent | 4 | 4 | 5.6 | 4 |
| Sulfur | 2 | 2 | 2 | 2 |
| Vulcanization accelerator | 1 | 1 | 1 | 1 |
| Viscosity | 95 | 102 | 105 | 90 |
| Workability | B | B | C | C |
| Wet performance | 95 | 110 | 101 | 95 |
| Low rolling resistance | 90 | 106 | 106 | 99 |

Details of the components listed in Table 3 are as follows.
Natural rubber: TSR20
Specific conjugated diene-based rubber: the specific conjugated diene-based rubber thus produced (containing 25 parts by mass of oil-extended oil per 100 parts by mass of the rubber)
SBR: Nipol NS612 (styrene unit content: 16 mass %, vinyl bond content: 31 mass %, Tg: −63° C., manufactured by Zeon Corporation)
Comparative conjugated diene-based rubber 1: the comparative conjugated diene-based rubber 1 thus produced (containing 25 parts by mass of oil-extended oil per 100 parts by mass of the rubber) (aromatic vinyl unit content: 42 mass %, vinyl bond content: 32 mass %, Tg: −25° C., Mw: 750000 (the measurement methods were each as described above)
Silica: Premium 200MP (CTAB adsorption specific surface area: 197 m$^2$/g, manufactured by Rhodia)
Comparative silica: Zeosil 1165MP (CTAB adsorption specific surface area: 159 m$^2$/g, manufactured by Rhodia)
Carbon black: SEAST KHP (manufactured by Tokai Carbon Co., Ltd.)
Processing aid: Struktol EF44 (manufactured by S&S)
Aromatic modified terpene resin: YS RESIN TO-125 (softening point: 125 ± 5° C., manufactured by Yasuhara Chemical Co., Ltd.)
Zinc oxide: Zinc Oxide #3 (manufactured by Seido Chemical Industry Co., Ltd.)
Stearic acid: beads stearic acid (manufactured by NOF CORPORATION)
Oil: Extract No. 4S (manufactured by Showa Shell Sekiyu K. K.)
Silane coupling agent: bis-(3-triethoxysilylpropyl) tetrasulfide (Si69, manufactured by Evonik Degussa)
Sulfur: Golden Flower oil-treated sulfur powder (the content of sulfur: 95.24 mass %, manufactured by Tsurumi Chemical Industry Co., Ltd.)
Vulcanization accelerator: SANTOCURE CBS (manufactured by FLEXSYS)

As understood from Table 3, the rubber composition for a tire according to the examples of the present application exhibited a low viscosity, and an excellent workability, wet performance and low rolling resistance.

Further, when the Examples 1 and 2 are compared, the Example 1 in which the content of the natural rubber in the diene-based rubber was 35 mass % or greater had a lower viscosity.

Further, when the Examples 1 and 3 are compared, the Example 1 in which the content of the specific conjugated diene-based rubber in the diene-based rubber is 40 mass % or greater had a lower viscosity, and exhibited a more excellent low rolling resistance.

Further, when the Examples 1 and 4 are compared, the Example 4 in which the aromatic modified terpene resin was contained exhibited a more excellent wet performance.

Further, when the Examples 1 and 5 are compared, the Example 1 in which the content of the silica is 40 parts by mass or greater per 100 parts by mass of the diene-based rubber exhibited a more excellent wet performance.

On the other hand, the Standard Example 1 in which the specific conjugated diene-based rubber was not contained had a high viscosity and exhibited insufficient workability, wet performance, and low rolling resistance.

Further, the Comparative Example 1 in which the natural rubber was not contained had insufficient workability and wet performance.

Further, the Comparative Example 2 in which the content of the natural rubber in the diene-based rubber exceeded 45 mass % had a high viscosity and exhibited insufficient workability and low rolling resistance.

Further, the Comparative Example 3 in which the content of the silica was 60 parts by mass or greater per 100 parts by mass of the diene-based rubber had high viscosity and exhibited insufficient workability and low rolling resistance.

Further, the Comparative Example 4 in which the CTAB adsorption specific surface area of the silica is less than 180 m²/g had insufficient workability and wet performance.

The invention claimed is:

1. A rubber composition for a tire, comprising: diene-based rubber and silica,
    the diene-based rubber containing natural rubber and specific conjugated diene-based rubber, a content of the natural rubber in the diene-based rubber being 30 to 45 mass %, and a content of the specific conjugated diene-based rubber in the diene-based rubber being from 30 to 70 mass %; and
    the specific conjugated diene-based rubber being conjugated diene-based rubber produced according to a method of producing conjugated diene-based rubber including the following steps of A, B, and C in this order, the conjugated diene-based rubber having: an aromatic vinyl unit content of from 38 to 48 mass %, a vinyl bond content of from 20 to 35 mass %, and a weight average molecular weight of from 500000 to 800000,
    a CTAB adsorption specific surface area of the silica being 180 m²/g or greater, and
    a content of the silica being less than 60 parts by mass per 100 parts by mass of the diene-based rubber;
    step A: polymerizing a monomer mixture containing isoprene and aromatic vinyl to form a polymer block A having an active terminal, the polymer block A having an isoprene unit content of from 80 to 95 mass %, an aromatic vinyl unit content of from 5 to 20 mass %, and a weight average molecular weight of from 500 to 15000;
    step B: mixing the polymer block A with a monomer mixture containing 1,3-butadiene and aromatic vinyl and continuing polymerization reaction so as to form a polymer block B having an active terminal continuously with the polymer block A to thereby obtain a conjugated diene-based polymer chain having an active terminal, the conjugated diene-based polymer chain having the polymer block A and the polymer block B; and
    step C: reacting the active terminal of the conjugated diene-based polymer chain with polyorganosiloxane represented by Formula (1):

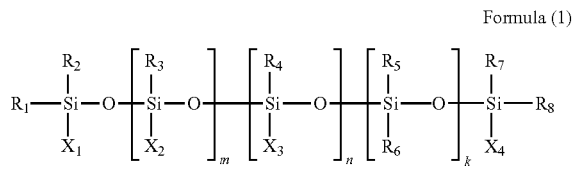

Formula (1)

where $R_1$ to $R_8$, which are alkyl groups having from 1 to 6 carbons or aryl groups having from 6 to 12 carbons, may be the same as or different from one another; $X_1$ and $X_4$, which are any group selected from the group consisting of alkyl groups having from 1 to 6 carbons, aryl groups having from 6 to 12 carbons, alkoxy groups having from 1 to 5 carbons, and epoxy group containing groups having from 4 to 12 carbons, may be the same as or different from one another; $X_2$ is an alkoxy group having from 1 to 5 carbons or an epoxy group containing group having from 4 to 12 carbons, and $X_2$ being plural may be the same as or different from one another; $X_3$ is a group containing from 2 to 20 repeating alkylene glycol units, and upon $X_3$ being plural, these may be the same as or different from one another; m is an integer from 3 to 200; n is an integer from 0 to 200; and k is an integer from 0 to 200.

2. The rubber composition for a tire according to claim 1, further comprising aromatic modified terpene resin having a softening point of from 100 to 150° C.,
    wherein a content of the aromatic modified terpene resin is from 1 to 50 parts by mass per 100 parts by mass of the diene-based rubber.

3. A pneumatic tire, wherein the rubber composition for a tire according to claim 2 is arranged in a cap tread.

4. A pneumatic tire, wherein the rubber composition for a tire according to claim 1 is arranged in a cap tread.

5. The rubber composition for a tire according to claim 1, wherein the content of the specific conjugated diene-based rubber in the diene-based rubber is from 30 to 39 mass %.

6. The rubber composition for a tire according to claim 1, wherein the content of the specific conjugated diene-based rubber in the diene-based rubber is from 30 to 37 mass %.

* * * * *